(12) United States Patent
Salerno (10) Patent No.: US 10,763,697 B2
(45) Date of Patent: Sep. 1, 2020

(54) SYSTEM AND METHOD OF CONTROLLING SUPPLY OF ELECTRICAL POWER

(71) Applicant: Wirebutter Pty Ltd, Victoria (AU)

(72) Inventor: Anthony Salerno, Montmorency (AU)

(73) Assignee: WireButter Pty Ltd, Victoria (AU)

( * ) Notice: Subject to any disclaimer, the term of this patent is extended or adjusted under 35 U.S.C. 154(b) by 437 days.

(21) Appl. No.: 15/504,809

(22) PCT Filed: Aug. 18, 2015

(86) PCT No.: PCT/AU2015/000492
§ 371 (c)(1),
(2) Date: Feb. 17, 2017

(87) PCT Pub. No.: WO2016/025981
PCT Pub. Date: Feb. 25, 2016

(65) Prior Publication Data
US 2017/0271918 A1    Sep. 21, 2017

Related U.S. Application Data

(60) Provisional application No. 62/072,926, filed on Oct. 30, 2014.

(30) Foreign Application Priority Data

Aug. 18, 2014   (AU) .................. 2014903220

(51) Int. Cl.
*H01R 13/70*    (2006.01)
*H01R 24/76*    (2011.01)
(Continued)

(52) U.S. Cl.
CPC .......... *H02J 13/0075* (2013.01); *H01R 13/70* (2013.01); *H01R 24/76* (2013.01);
(Continued)

(58) Field of Classification Search
CPC .... H01R 13/70; H01R 24/76; H01R 13/6683; H02J 13/0075; H05B 37/0263; H05B 37/0272; G06Q 50/06
(Continued)

(56) References Cited

U.S. PATENT DOCUMENTS 8,461,725 B1   6/2013   Stubbs et al.
8,849,596 B2   9/2014   Ting et al.
(Continued)

FOREIGN PATENT DOCUMENTS

CN      102484503 A    5/2012
JP      2001069691 A   3/2001
(Continued)

OTHER PUBLICATIONS

Jun. 27, 2019, Office Action in Japanese Patent Application No. 2017-509777, with English translation.

*Primary Examiner* — Rexford N Barnie
*Assistant Examiner* — Toan T Vu
(74) *Attorney, Agent, or Firm* — The Webb Law Firm (57) ABSTRACT

An electrical power outlet including a computer processor having a memory operably connected thereto storing computer instruction code, a control module for controlling the supply of electrical power from the outlet upon receipt of a control signal from the computer processor, and a communications module for connection with a plurality of external electrical power outlets, wherein the computer instruction code, when executed by the computer processor, causes the computer processor to control the supply of electrical power from the outlet according to predetermined conditions stored in the computer memory, and transmit contents of the computer memory to the plurality of external electrical power outlets and receive memory contents from a plurality of external electrical power outlets.

28 Claims, 4 Drawing Sheets

(51) Int. Cl.
   *H02J 13/00*    (2006.01)
   *H05B 47/19*    (2020.01)
   *H05B 47/185*   (2020.01)
   *H01R 13/66*    (2006.01)
   *G06Q 50/06*    (2012.01)

(52) U.S. Cl.
   CPC ........... *H05B 47/185* (2020.01); *H05B 47/19* (2020.01); *G06Q 50/06* (2013.01); *H01R 13/6683* (2013.01)

(58) Field of Classification Search
   USPC ......... 307/115, 31, 34, 35, 40, 39; 375/257; 439/120, 373, 435; 340/870.01, 870.02, 340/870.03; 379/102.01, 102.02, 102.04, 379/102.05, 106.03, 106.04
   See application file for complete search history.

(56) References Cited

U.S. PATENT DOCUMENTS

| | | |
|---|---|---|
| 2003/0041226 A1 | 2/2003 | Yang et al. |
| 2010/0070217 A1* | 3/2010 | Shimada ............... G01D 4/008 702/62 |
| 2010/0145536 A1 | 6/2010 | Masters et al. |
| 2010/0217450 A1 | 8/2010 | Beal et al. |
| 2012/0223840 A1 | 9/2012 | Guymon et al. |
| 2013/0041605 A1 | 2/2013 | Ting et al. |
| 2013/0083805 A1 | 4/2013 | Lu et al. |
| 2014/0277783 A1* | 9/2014 | Knuth ................... G01D 4/002 700/286 |
| 2017/0149243 A1* | 5/2017 | Dozier .................... H02J 3/14 |

FOREIGN PATENT DOCUMENTS

| | | |
|---|---|---|
| JP | 2007129661 A | 5/2007 |
| JP | 2008178160 A | 7/2008 |
| JP | 2008263398 A | 10/2008 |
| JP | 2014068436 A | 4/2011 |
| JP | 3169405 U | 7/2011 |
| JP | 2014072561 A | 4/2014 |
| WO | 2008135895 A2 | 11/2008 |
| WO | 2010141859 A1 | 12/2010 |
| WO | 2011048182 A1 | 4/2011 |

* cited by examiner

Fig. 4

SYSTEM AND METHOD OF CONTROLLING SUPPLY OF ELECTRICAL POWER

CROSS REFERENCE TO RELATED APPLICATIONS

This application is the United States national phase of International Application No. PCT/AU2015/000492 filed Aug. 18, 2015, which claims benefit of U.S. Provisional Application No. 62/072,926 filed Oct. 30, 2014, and claims priority to Australian Patent Application No. 2014903220 filed Aug. 18, 2014, the disclosures of which are hereby incorporated in their entirety by reference.

FIELD OF THE INVENTION

The present invention relates to a system and method of controlling supply of electrical power, and, in particular, a system and method involving a network of electrical power outlets in a home, building, apartment, office or other dwelling wherein each individual power outlet includes its own memory and processor for at least controlling the supply of electrical power from the outlet, and wherein information is communicated between the power outlets. The invention further relates to an electrical power outlet or network thereof and the computer instruction code that controls the operation of electrical power outlets according to the invention.

BACKGROUND OF THE INVENTION

Residential homes are typically supplied with electrical power from a power grid, wherein electrical power is delivered to a home from a source of power such as an electrical power substation has been stepped down to a working voltage that meets legislative requirements of a particular location. For example, in Australia, UK and New Zealand, the voltage is stepped down such that the supply is within −6% and +10% of 230 Vac. In the United States, the voltage is stepped down to between approximately 100 Vac and 127 Vac. For this reason, different countries typically have their own unique power outlet configurations including unique connection sockets for appliances that consume electricity.

A typical electrical power supply system for a residential home that enables control of individual electrical power outlets includes a central or master control computer or device which is supplied power from the grid, wherein the control device distributes electricity to a network of electrical power outlets throughout the home. In such systems, the central controller represents a "single point of failure", which means that a fault in the central controller will typically cause the entire system including all of the remaining power outlets to fail, or operate incorrectly. A fault in the central controller typically requires access to the central control unit to re-set the controller and re-activate the supply of electricity to the electrical power outlets. Power failures across all power outlets of a home, office, building, apartment, etc, have the potential to cause loss and damage including but not limited to data loss, damage to devices connected to each power outlet, significant repair costs, not to mention safety concerns for persons including children who may be operating the devices or in the vicinity of the power outlets. In the instance of electrically powered equipment such as refrigeration and or freezer units, the contents of such equipment can spoil in the event of a lack of electrical power and this can result in significant consequential loss.

The "automated" supply of electricity to individual power outlets within a home or other dwelling has become increasingly popular, whereby the supply of electricity from the master control device to any one power outlet may be controlled or configured such that power is supplied to a particular outlet according to user selection which may be via wired or wireless instructions sent from a user device. For example, remote automation may involve electrical control of individual power outlets through portable electronic devices such as mobile phones, tablets, or similar devices. However, known automated systems rely upon a master control computer for controlling the supply of electricity from individual power outlets. The "single point of failure" problem is a significant and sometimes regular problem that is frustrating to users. Further, central controllers typically implement a proprietary control protocol there by requiring users to purchase electrical power outlets that utilise the same protocol and hence they are usually "locked in" to purchasing additional electrical power outlets from the same manufacturer of the central control unit.

Existing centrally controlled electrical power supply systems therefore suffer a range of problems.

In summary, hitherto known systems of supplying electrical power in homes, buildings, and other environments typically use a master controller computer or device to individually manage the power monitoring, measurement, power control and automation of devices in a network, which results in a number of disadvantages some of which some are described above.

It is therefore an object of the present invention to overcome at least some of the aforementioned problems or to provide the public with a useful alternative.

SUMMARY OF THE INVENTION

According to an aspect, the present invention provides a method of controlling supply of electrical power, including providing individual electrical power outlets in a network of electrical power outlets with a computer processor having a memory operably connected thereto, controlling, by each computer processor, the supply of electrical power from the corresponding electrical power outlet according to predetermined conditions stored in the computer memory of the corresponding electrical power outlet, and transmitting contents of the computer memory of each electrical power outlet to other electrical power outlets in the network of electrical power outlets and receiving memory contents in each electrical power outlet from other electrical power outlets in the network.

In an embodiment, the method further includes receiving, in the computer memory of an electrical power outlet, instructional data relating to a supply of electrical power from the electrical power outlet, and wherein said instructional data defines the predetermined conditions upon which electrical power is supplied to said electrical power outlet.

In an embodiment, the instructional data is received via a user interface including a wired connection to the outlet.

In an alternate embodiment, the instructional data is received via a user interface or portable device including a wireless connection to the outlet.

In an embodiment, each power outlet includes or has associated therewith a wireless modem, and the instructional data is received via a user interface or portable device including a wireless connection to the modem.

In an embodiment, said wireless modem is a device connected to an electrical power outlet.

In an embodiment, said portable device includes a Bluetooth or WiFi device.

In an embodiment, said transmitting and receiving the memory contents in each power outlet is via powerline communication.

In an embodiment, said transmitting and receiving the memory contents in each power outlet is at predetermined intervals.

In an embodiment, the method further includes measuring, by each computer processor, the electrical power supplied by the corresponding electrical power outlet, and storing measurements of the electrical power supplied by the corresponding electrical power outlet in the computer memory operably connected thereto.

According to another aspect, the present invention provides a system of controlling supply of electrical power, the system including a network of electrical power outlets including two or more controllable electrical power outlets, each controllable power outlet including a computer processor and a memory operably connected thereto storing computer instruction code, a control module for controlling the supply of electrical power from the outlet upon receipt of a control signal from the computer processor, and a communications module for connection with other electrical power outlets of said network of electrical power outlets, wherein the computer instruction code, when executed by the computer processor, causes the computer processor to control the supply of electrical power from the outlet according to predetermined conditions stored in the computer memory, and transmit contents of the computer memory to the other electrical power outlets of said network of electrical power outlets, and receive memory contents from the other electrical power outlets in the network.

In an embodiment, the predetermined conditions are defined by instructional data received in the computer memory of each electrical power outlet relating to a supply of electrical power from the corresponding electrical power outlet.

In an embodiment, the system further includes a user interface including a wired connection to the outlet wherein instructional data is received via the user interface.

In an alternate embodiment, the system further includes a user interface or a portable device including a wireless connection to the outlet communications module wherein instructional data is received via the user interface or portable device.

In an embodiment, the system further includes a user interface or a portable device capable of establishing an internet connection to the outlet, wherein instructional data is received via the user interface or portable device.

In an embodiment, the outlet includes or has associated therewith a wireless modem, and the instructional data is received via the user interface or portable device including a wireless connection to the modem.

In an embodiment, said wireless modem is a device connected to one of the electrical power outlets in the system.

In an embodiment, said portable device includes a Bluetooth or WiFi device.

In an embodiment, the system includes powerlines connecting each electrical power outlet, wherein transmitting and receiving the memory contents in each power outlet is via powerline communication.

In an embodiment, said transmitting and receiving the memory contents in each power outlet is at predetermined intervals.

In an embodiment, each power outlet further includes a measurement module to measure the electrical power supplied by the corresponding electrical power outlet.

In an embodiment, the measurements are stored in the computer memory operably connected to the corresponding electrical power outlet.

In an embodiment, the electrical power outlet is a wall mounted outlet.

In an alternate embodiment, the electrical power outlet is in the form of an electrical extension board including said computer processor, memory, control module and communications module.

According to an aspect, the present invention provides an electrical power outlet including a computer processor having a memory operably connected thereto storing computer instruction code, a control module for controlling the supply of electrical power from the outlet upon receipt of a control signal from the computer processor, and a communications module for connection with a plurality of other electrical power outlets; wherein the computer instruction code, when executed by the computer processor, causes the computer processor to control the supply of electrical power from the electrical power outlet according to predetermined conditions stored in the computer memory, and transmit contents of the computer memory to the plurality of other electrical power outlets and receive memory contents from the plurality of other electrical power outlets.

In an embodiment, the electrical power outlet further includes a measurement module that measures the electrical power supplied by the electrical power outlet, and wherein the computer instruction code, when executed by the computer processor, causes the computer processor to further store measurements of the electrical power supplied by the electrical power outlet in the computer memory.

In an embodiment, the predetermined conditions are defined by instructional data received in the computer memory of each electrical power outlet relating to a supply of electrical power from the corresponding electrical power outlet.

In an embodiment, the electrical power outlet further includes a user interface including a wired connection to the outlet wherein instructional data is received via the user interface.

In an alternate embodiment, the electrical power outlet further includes a user interface or a portable device including a wireless connection to the outlet communications module wherein instructional data is received via the user interface or portable device.

In an embodiment, the electrical power outlet is a wall mounted outlet.

In an alternate embodiment, the electrical power outlet is in the form of an electrical extension board including said computer processor, memory, control module and communications module. In this embodiment, the transmission of the computer memory contents to other electrical power outlets is particularly important since it is more difficult to ensure that an electrical extension board remains connected to the electrical power supply. For example, as compared with a fixed power outlet that is permanently connected to the electrical power supply of a premises (such as an outlet installed by an electrical worker), an electrical extension board that is plugged into a permanently connected outlet may be disconnected easily by a user. Whilst an electrical extension board is a particularly convenient embodiment for consumers since they can install such outlets themselves without the need to engage the services of an electrical worker, they embody the disadvantage that they can be easily unplugged which may occur accidentally after establishing the instructions for the supply of power from the extension board.

According to the invention, the memory contents of the electrical extension board will be shared with all other devices and hence, there is a store of those memory instructions in other electrical power outlets that the extension board can obtain in the event that it is accidentally unplugged and then reconnected with the electrical power supply of the premises.

BRIEF DESCRIPTION OF THE FIGURES

The accompanying drawings, which are incorporated in and constitute a part of this specification, illustrate several implementations of the invention and, together with the description, serve to explain the advantages and principles of the invention. In the drawings:

FIG. 5 is a schematic diagram of a power outlet in the form of an electrical extension board in accordance with an embodiment of the present invention.

DESCRIPTION OF THE PREFERRED EMBODIMENTS

The following detailed description of the invention refers to the accompanying drawings. Although the description includes exemplary embodiments, other embodiments are possible, and changes may be made to the embodiments described without departing from the spirit and scope of the invention. Wherever possible, the same reference numbers will be used throughout the embodiments and the following description to refer to the same and like parts.

The present invention relates to a system 10 and method of controlling supply of electrical power to devices 12 which consume electrical power within a home, office, apartment, or any other dwelling to which mains electricity is supplied. The present invention may also relate to a single electrical power outlet 14, or a network of linked outlets 14 which may form part of the system 10, configured such that the requirement to have a central controller controlling the supply of electrical power to each power outlet within the network is eliminated.

Figure 1:
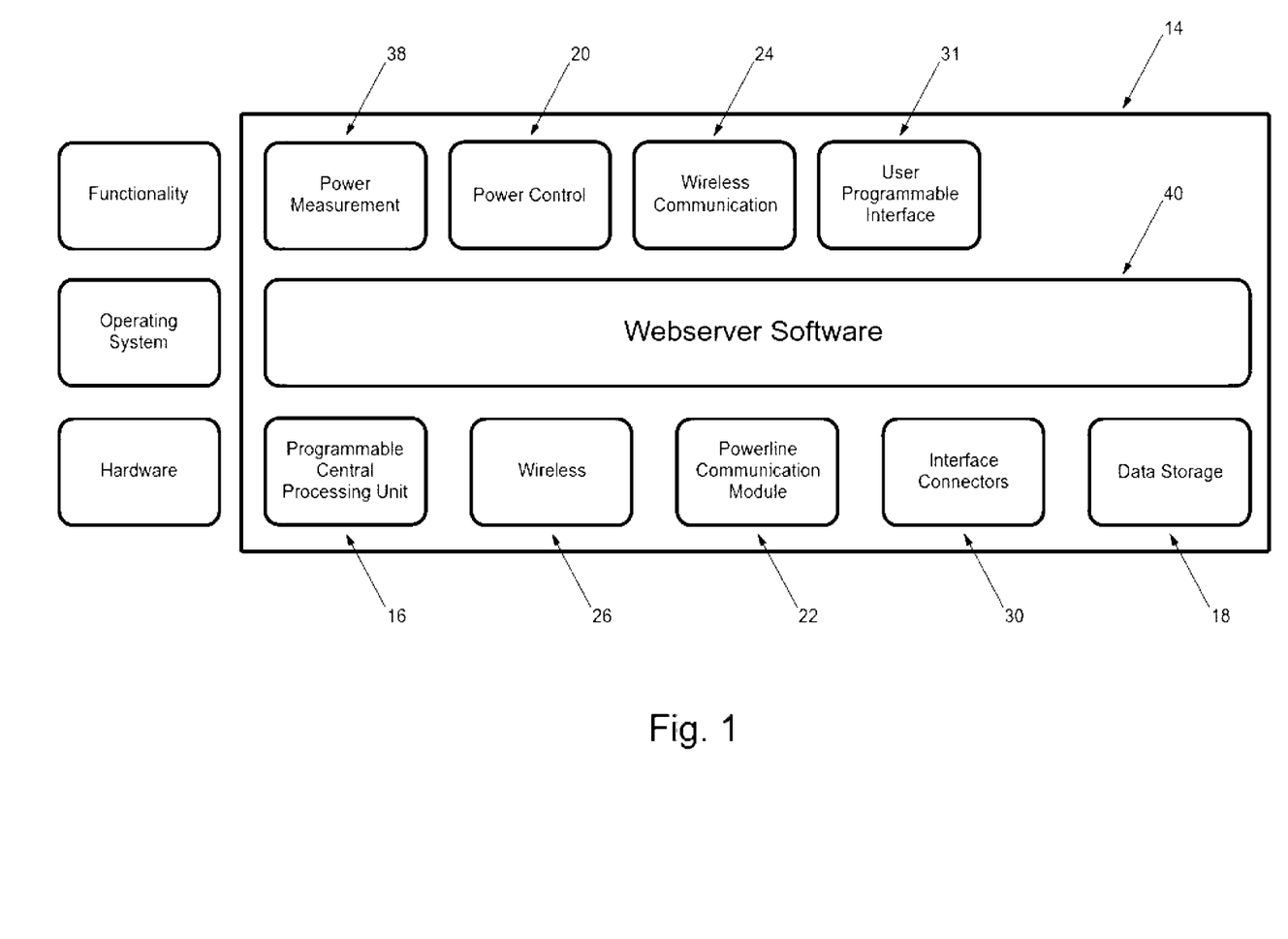
FIG. 1 is a functional diagram of a single electrical power outlet according to an embodiment of the present invention.

FIG. 1 illustrates an embodiment of hardware, operating system and functionality that may be present in each electrical power outlet 14. Each electrical power outlet 14 includes at least a computer processor 16 having a memory 18 operably connected thereto storing computer instruction code, a control module 20 for controlling the supply of electrical power from the outlet to a device 12 upon receipt of a control signal from the computer processor, and a communications module 22 for connection with a plurality of other electrical power outlets 14 in a network. The communications module 22 may be a powerline communication module, for example. The computer instruction code, when executed by the computer processor, causes the computer processor to control the supply of electrical power from the outlet 14 to a corresponding device 12 according to predetermined conditions stored in the computer memory 18 of the outlet 14.

It is to be understood that reference herein to the word "module" may be in the form of a software module that may be executed by the processor 16, but may equally incorporate software as well as hardware components.

The stored predetermined conditions may be user specified conditions, examples of which are described in more detail below, or may be generated based on other information including that which is stored in and received from other electrical power outlets in a network of such outlets. For example, a condition may indicate a maximum power usage through an outlet, and based on this "instructional data", the particular outlet may send an alert to the other outlets when power usage through the outlet reaches the threshold. Another example of a predetermined condition is that a particular light needs to be switched off by a certain time, wherein the particular outlet may send an alert to the other outlets when power usage remains on past the designated time.

In one embodiment, pre-defined rules are established that determine the action to be taken in response to power levels or alerts. For example, if a power outlet is above a threshold, then a rule may cause the initiation of an email to provide an alert to the recipient or, the device may be disconnected from the power supply. In the instance of a rule that specifies the disconnection of a device at a designated time, the rules may also include additional conditions that may need to be taken into account or actions that will occur once the designated time is reached.

The skilled addressee would appreciate that in configuring each individual power outlet 14 in a network of power outlets with its own processor 16 and memory 18, and linking each power outlet 14 such that information is shared between outlets, failure in one outlet will not necessarily result in failure in all outlets. This is clearly depicted in FIG. 2 which shows three outlets 14 wherein the third outlet fails but does not affect the supply of electricity through each of the first and second outlets which will receive information relating to the failure of the third outlet. Each outlet accordingly has the ability to communicate with its peers, and hence there is no single point of failure. Each outlet can thus monitor each other with a "heart beat" that detects a fault of an outlet, and a signal can be sent to signify the outlet that is suspected to be faulty. In addition, in the event of failure, each outlet 14 may be able to take the role of its peers and provide information as required.

Figure 2:
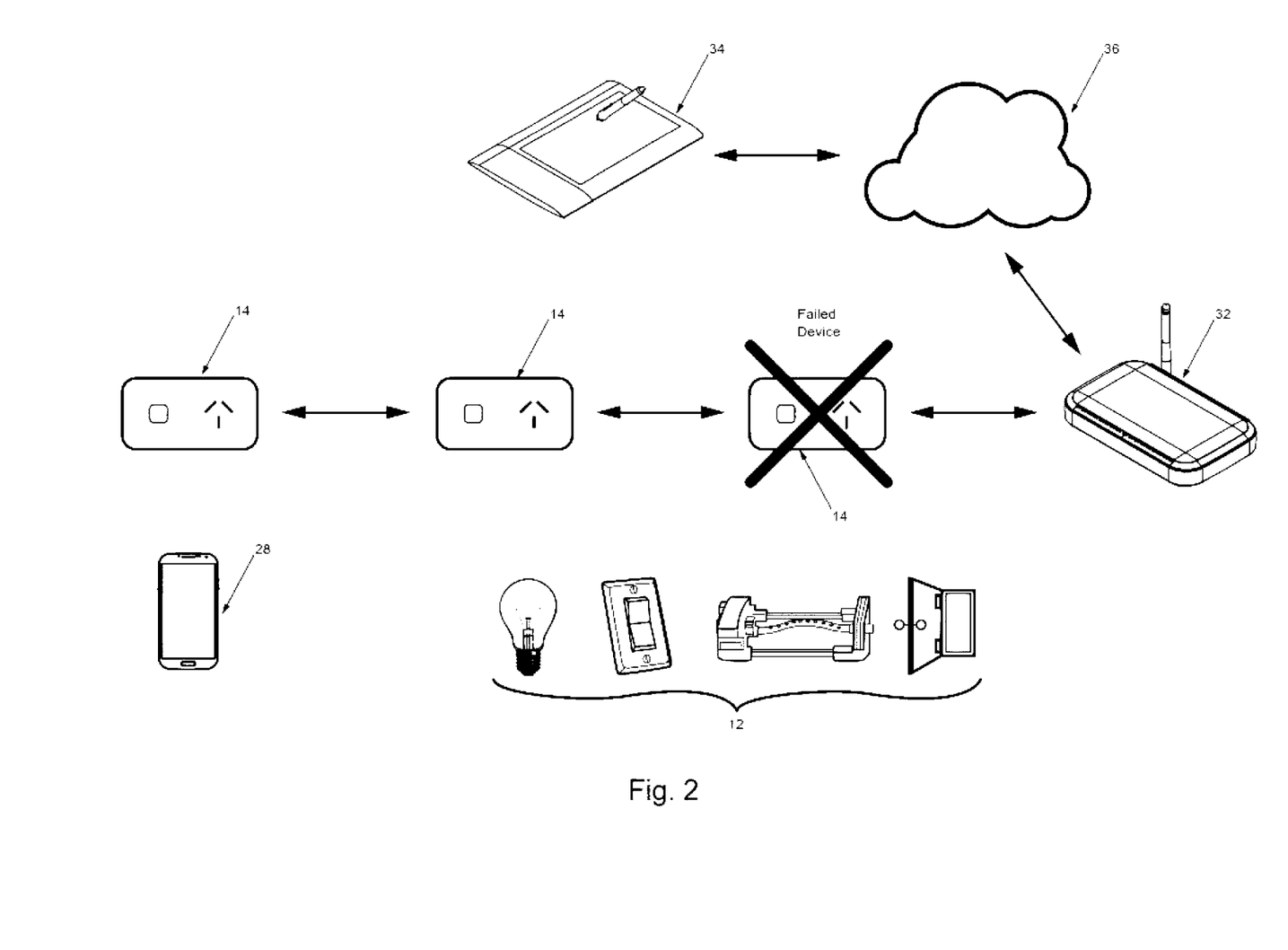
FIG. 2 is a schematic diagram of a system for supplying electrical power including a network of electrical power outlets in accordance with an embodiment of the present invention.

The fact that each outlet 14 has an individual processor 16 and memory 18 also allows for easier and more flexible control over electricity consumption across all outlets, which may result in reductions in overall electricity consumption and hence cost to the end user. For example, each outlet 14 may be configured such that energy supply to devices 12 attached to the outlets 14 may be controlled according to instructions stored in the memory of each outlet, and/or controlled in real-time whereby instructions are received from the user via wired or wireless communication.

There are at least two scenarios in which "remote" or wireless control may be achieved, namely, control from a relatively short distance (e.g. from inside the residence) and control from larger distances (e.g. from a location outside the residence).

Remote control of each outlet 14 from a relatively short distance may be achieved by wired or wireless communications within the residence. For example, each outlet may include a wireless communication module 24 and associated hardware 26 to enable the outlet 14 to receive signals and hence information including power supply instructions from a wireless transmitter. Such a transmitter may be in the form of a purpose built wireless transmitter (not shown), or may be a mobile phone 28 or other user device connected to a home wireless network in which appropriate software or application may be installed to enable the device to wirelessly communicate with each outlet receiver.

In on embodiment, the transmitter is a purpose built device including a processor and user interface (not shown) located inside the residence (similar to a wall-mounted controller for an air conditioner) which provides a visual display to the user and ability to control power supply through each electrical power outlet by receiving instructions via the interface. In this particular embodiment, the controller is connected to each outlet by a wired or wireless connection. In the case of wired connection, the appropriate interface connectors 30 are associated with each outlet 14. In this embodiment, the interface connectors allow expansion of the capabilities of a power outlet. For example, an Original Equipment Manufacturer (OEM) version of the power outlet could be enhanced by the addition of further electronic components to the power outlet such that the power outlet could, for example, operate a fan or activate an alarm.

Alternatively, a user programmable interface 31 may form part of the outlet itself as shown in FIG. 1 by way of example.

Figure 3:
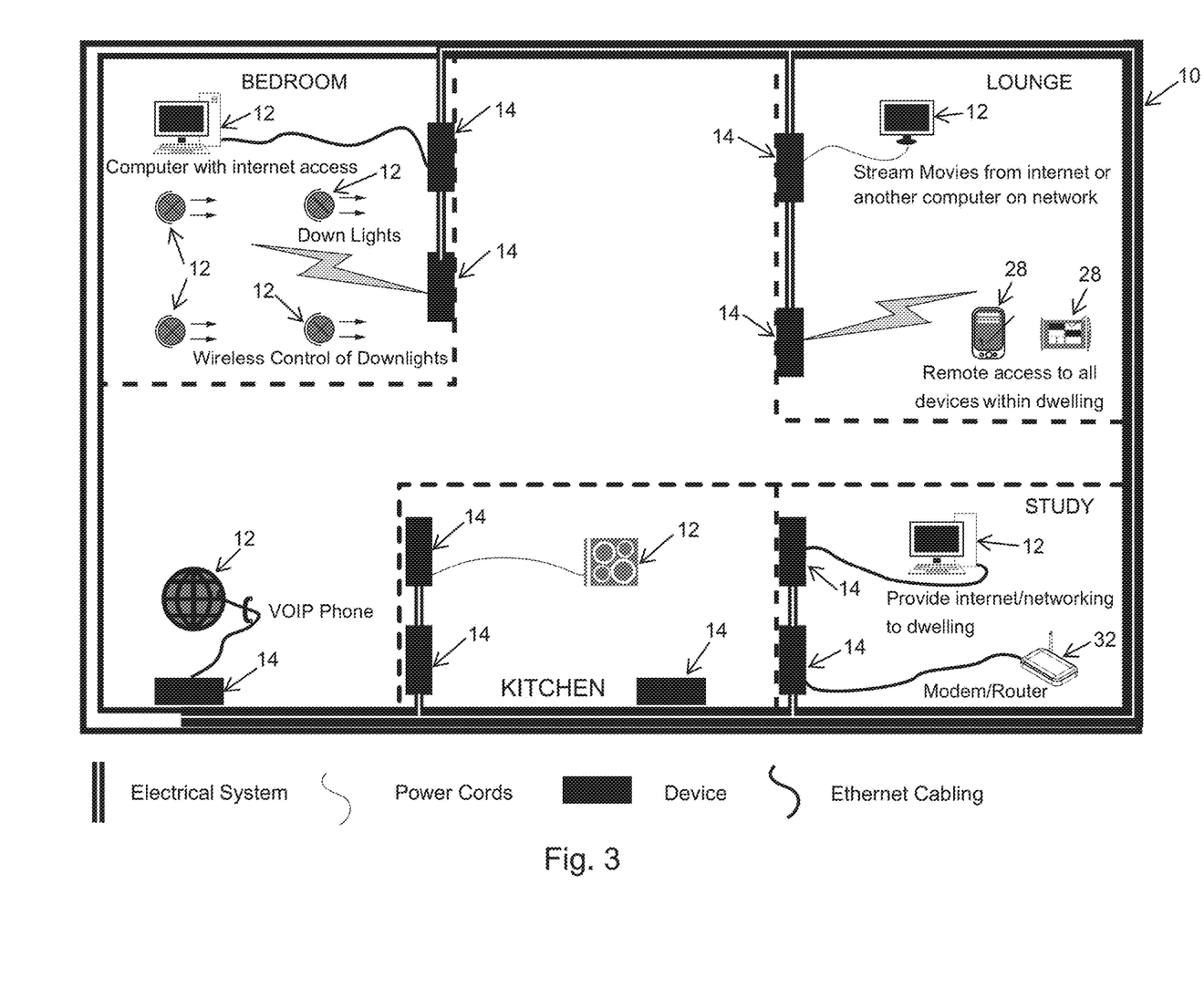
FIG. 3 is a schematic diagram including a plan view of a residential home including a system for supplying electrical power including a network of electrical power outlets arranged according to an embodiment of the present invention.

Each outlet 14 may further include an inbuilt modem (not shown), or an external modem 32 as shown in FIGS. 2 and 3 could equally well be plugged into an outlet 14, to enable access to the internet. The skilled addressee would realise that access to the internet enables control of the outlets 14 from remote locations outside the residence (as well as inside). By way of example, information that is stored in each memory of each outlet may be accessed or manipulated, via the modem, by external devices such as mobile phones, tablets and the like 34 which have internet access. Such information could, for example, be stored in a cloud environment 36 and accessed or manipulated using such portable devices 34.

Typical instructions to control each outlet 14 may include, for example, instructions relating to a specific time range between which electricity is to be supplied or not supplied to a device plugged into a particular outlet. By way of example, an air conditioner may be plugged into a fifth power outlet in a network of twenty power outlets at a residence, and the specific instructions to that outlet may be to commence supply of electricity at a particular time of day before the resident arrives home. This would ensure the resident arrives home to a cooled home. A further example may be lights inside or outside the home which the resident would like to switch on prior to arriving home. A yet further example may be where the amount of electricity supplied at an outlet may be varied to suit different application, including for example for dimming lights, etc. It is to be understood however that control instructions could relate to any control parameter ranging from control over the time electricity is supplied through the outlet to how much electricity is being supplied at any one time.

It is envisaged that means to override the stored predetermined conditions or instructions will form part of each outlet 14. This may be in the form of a master switch for example which the user may turn to an off position to disable the processor, for example.

Other types of control over the electricity supply not necessarily mentioned herein may also be possible and are to be considered within the scope of the present invention. Interfaces may further include information or visual images such as plans of the residence, the nature of the device attached to each outlet, and any other information or visual that may assist the user in identifying a power outlet and a device associated therewith.

Each outlet 14 may further include a measurement module 38 that measures the electrical power supplied from the electrical power outlet to a device 12 connected thereto. The computer instruction code, when executed by the computer processor, may cause the computer processor 16 to store measurements of the electrical power supplied by the electrical power outlet in the computer memory 18. These stored measurements may form part of information that is regularly transferred between the outlets 14 to enable other outlets 14 to recognise when another has failed, and do what is necessary to address the failure.

Each outlet 14 may further includes its own webserver software 40, as also shown in FIG. 1, which may form the operating system for managing the hardware resources of each outlet. Such operating systems and associated software may be updated regularly, which makes the system of the present invention adaptable to technology advances. Each outlet may include open Application Programmable Interfaces (API's) capable of being programmed by third party programmers.

Figure 4:
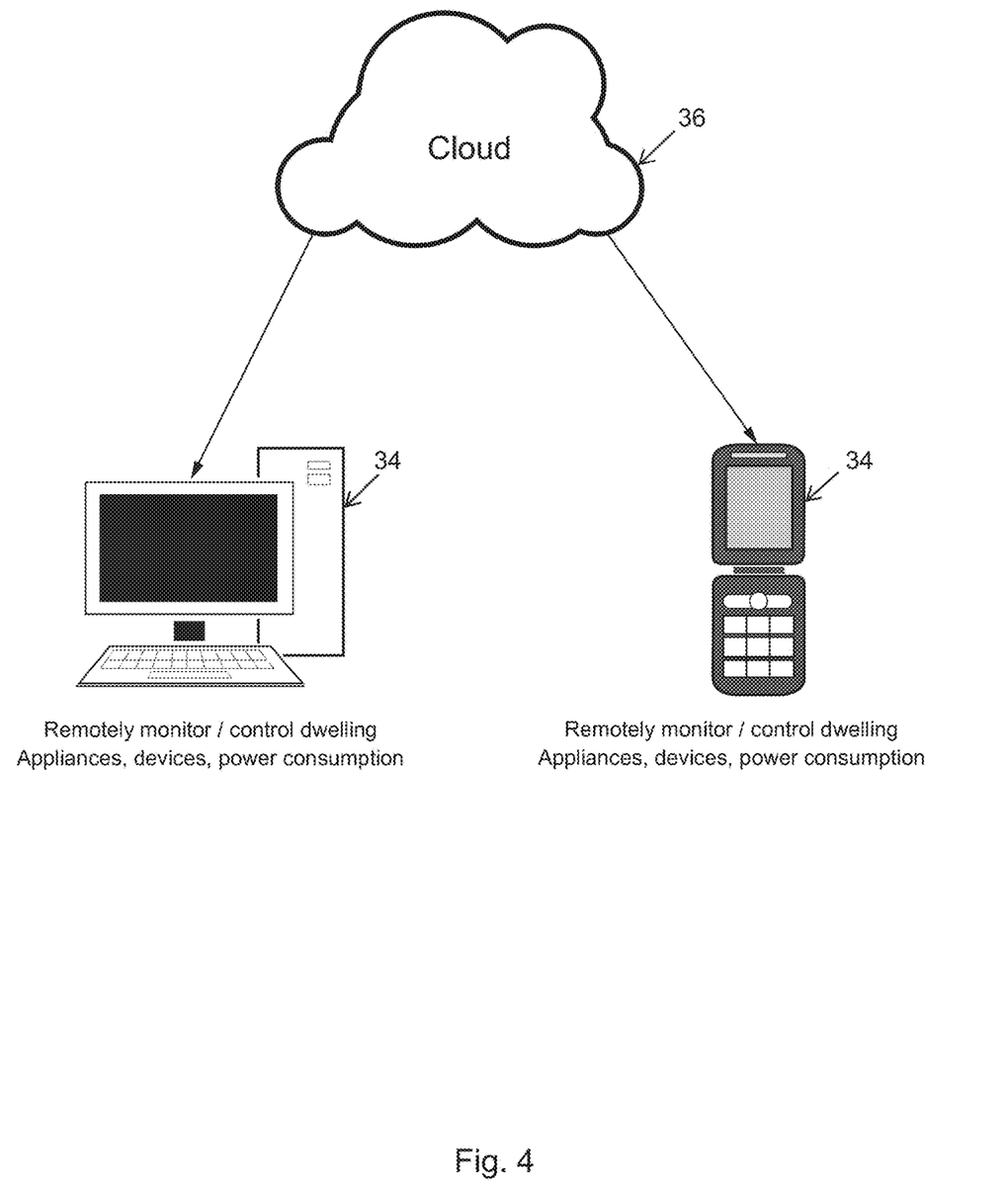
FIG. 4 is a schematic diagram of elements relating to the residential home illustrated in FIG. 3.

An example of the system 10 present invention being applied to a residential home comprising of five main areas is shown in FIGS. 3 and 4. It can be appreciated in this example that the electrical system is used to allow communication between outlets 14 using powerline communication, hence allowing for dwelling networking ability across all outlets (and associated devices) connected to the electrical system. The reader will appreciate that some of the devices 12 to which the supply of electricity may be controlled include lights, kitchen appliances, home computers and landline phones. Such devices 12 may also be battery operated and wirelessly controlled, but such devices may still require electricity supply to wireless controllers associated therewith.

The benefits of the present invention should now be realised. Any home new or old may be fitted with the outlets 14 of the present invention, hence automatically creating a home including a network of linked power outlets and enabling the user(s) to monitor and control devices remotely. Electricity from the grid may be supplied to each of the power outlets as per existing electrical set ups where electricity is supplied via a distribution box or the like associated with each home or property. The outlets can be remotely controlled, and also updated to ensure latest software is available to take advantage of new technologies. Outlets failing on the network will not take down the entire system 10, and each outlet 14 may take responsibility of network activity.

An alternate embodiment of the present invention is shown in FIG. 5 in which individual electrical power outlets 14 are arranged in the form of an electrical extension board 38 including a computer processor, memory, control module and communications module. The electrical extension board 38 is operable to be connected to a wall mounted electrical power outlet 42 by electrical power cord 46. In this embodiment, the transmission of the computer memory contents to other electrical power outlets 14 is particularly important since, as compared with fixed power outlet 42 that is permanently connected to the electrical power supply of a premises (such as an outlet installed by an electrical worker), power cord 46 of electrical extension board 38 that is plugged into permanently connected outlet 42 may be readily disconnected by a user.

Further advantages and improvements may be made to the present invention without deviating from its scope. Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus.

In any claims that follow and in the summary of the invention, except where the context requires otherwise due to express language or necessary implication, the word "comprising" means "including", i.e. the features specified may be associated with further features in various embodiments of the invention.

The invention claimed is:

1. An electrical power outlet including:
   a computer processor having a computer memory operably connected thereto storing computer instruction code;
   a control module for controlling a supply of electrical power from the outlet upon receipt of a control signal from the computer processor; and
   a communications module for connection with a plurality of external electrical power outlets;
   wherein the computer instruction code, when executed by the computer processor, causes the computer processor to:
   control the supply of electrical power from the outlet according to predetermined conditions stored in the computer memory; and
   transmit contents of the computer memory to the plurality of external electrical power outlets and receive memory contents from the plurality of external electrical power outlets within a network of power outlet;
   whereby, upon detecting failure of any one or more electrical power outlets within the network of electrical power outlets, the computer processor is caused to transmit the contents of the computer memory to the one or more failed electrical power outlets, thereby providing the computer instruction code required by the one or more electrical power outlets that failed.

2. An electrical power outlet according to claim 1, wherein the electrical power outlet includes a measurement module that measures the electrical power supplied by the electrical power outlet, and wherein the computer instruction code, when executed by the computer processor, causes the computer processor to further store measurements of the electrical power supplied by the electrical power outlet in the computer memory.

3. An electrical power outlet according to claim 1, wherein the pre-determined conditions are defined by instructional data received in the computer memory of the electrical power outlet.

4. An electrical power outlet according to claim 3, wherein the contents of the computer memory transmitted to the plurality of external electrical power outlets includes the instructional data defining the pre-determined conditions and the memory contents received from the plurality of external electrical power outlets also includes the instructional data defining the pre-determined conditions for each of the respective plurality of external electrical power outlets.

5. An electrical power outlet according to claim 1, wherein the electrical power outlet further includes a user interface including a wired connection to the outlet wherein instructional data is received via the user interface.

6. An electrical power outlet according to claim 1, wherein the electrical power outlet further includes a wireless connection module operably connected to the communications module and wherein the wireless connection module is operable to communicate to a user interface in a portable device and further wherein instructional data is received by the electrical power outlet from the user interface of the portable device.

7. An electrical power outlet according to claim 6, wherein the portable device includes any one or more of:
   a mobile phone;
   a laptop computer;
   a personal computing tablet;
   a wearable computing watch device.

8. An electrical power outlet according to claim 1, wherein the electrical power outlet is a wall mounted device.

9. An electrical power outlet according to claim 1, wherein the electrical power outlet is located on an electrical extension board operable to be connected to a wall mounted electrical power outlet wherein the electrical extension board includes the computer processor, memory, control module and communications module.

10. A method of controlling supply of electrical power, including:
    providing individual electrical power outlets in a network of electrical power outlets with a computer processor having a computer memory operably connected thereto;
    controlling, by each computer processor, the supply of electrical power from the corresponding electrical power outlet according to predetermined conditions stored in the computer memory of the corresponding electrical power outlet; and
    transmitting contents of the computer memory of each electrical power outlet to other electrical power outlets in the network of electrical power outlets and receiving memory contents in each electrical power outlet from other electrical power outlets in the network;
    whereby, upon detecting failure of any one or more electrical power outlets within the network of electrical power outlets, the computer processor is caused to transmit the contents of the computer memory to the one or more failed electrical power outlets, thereby providing the computer instruction code required by the one or more electrical power outlets that failed.

11. A method of controlling supply of electrical power according to claim 10 further including receiving, in the computer memory of an electrical power outlet, instructional data relating to supply of electrical power from the electrical power outlet, and wherein said instructional data defines the predetermined conditions upon which electrical power is supplied to said electrical power outlet.

12. A method of controlling supply of electrical power according to claim 11, wherein the instructional data is received via a user interface that is operably connected by a wired connection to the electrical power outlet.

13. A method of controlling supply of electrical power according to claim 11, wherein instructional data is received via a user interface or portable device that is operably connected by a wireless connection to the electrical power outlet.

14. A method of controlling supply of electrical power according to claim 10, wherein transmitting and receiving the memory contents in each power outlet is via power line communication.

15. A method of controlling supply of electrical power according to claim 10, wherein said transmitting and receiving the memory contents in each power outlet is performed at pre-determined interval.

16. A method of controlling supply of electrical power according to claim 10 including measuring, by each computer processor, the electrical power supply by the corresponding electrical power outlet and storing the measurements of the electrical power supplied by the corresponding electrical power outlet in the computer memory operably connected thereto.

17. A system of controlling supply of electrical power, the system including:
- a network of electrical power outlets including two or more controllable electrical power outlets, each controllable power outlet including:
- a computer processor and a computer memory operably connected thereto storing computer instruction code;
- a control module for controlling the supply of electrical power from the outlet upon receipt of a control signal from the computer processor; and
- a communications module for connection with other electrical power outlets of said network of electrical power outlets;
- wherein the computer instruction code, when executed by the computer processor, causes the computer processor to:
- control the supply of electrical power from the outlet according to predetermined conditions stored in the computer memory; and
- transmit contents of the computer memory to the other electrical power outlets of said network of electrical power outlets, and receive memory contents from the other electrical power outlets in the network;
- whereby, upon detecting failure of any one or more electrical power outlets within the network of electrical power outlets, the computer processor is caused to transmit the contents of the computer memory to the one or more failed electrical power outlets, thereby providing the computer instruction code required by the one or more electrical power outlets that failed.

18. A system of controlling supply of electrical power according to claim 17, wherein the predetermined conditions are defined by instructional data received in the computer memory of each electrical power outlet relating to a supply of electrical power from the corresponding electrical power outlet.

19. A system of controlling supply of electrical power according to claim 17, wherein the system further includes a user interface operably connected by a wired connection to the network of electrical power outlets wherein instructional data is received via the user interface.

20. A system of controlling supply of electrical power according to claim 17, wherein the system further includes a user interface including a wired connection to the network of electrical power outlets wherein instructional data is received via the user interface.

21. A system of controlling supply of electrical power according to claim 17, wherein the system includes a wireless connection module operably connected to the outlet communications module and wherein instructional data is received via the user interface.

22. A system of controlling supply of electrical power according to claim 17, wherein the system further includes an internet connection module operable to establish an internet connection with the plurality of electrical power outlets and wherein instructional data is received via a portable device connected to the internet.

23. A system of controlling supply of electrical power according to claim 17, wherein the plurality of electrical power outlets is interconnected with electrical power lines and wherein transmitting and receiving the memory contents of each power outlet is effected by power-line communication.

24. A system of controlling supply of electrical power according to claim 17, wherein the transmitting and receiving of memory contents in each power outlet is performed at predetermined intervals.

25. A system of controlling supply of electrical power according to claim 17, wherein each of the plurality of electrical power outlets includes a measurement module to measure the electrical power supplied by the corresponding electrical power outlet.

26. A system of controlling supply of electrical power according to claim 17, wherein the measurements are stored in the computer memory operably connected to the corresponding electrical power outlet.

27. A system of controlling supply of electrical power according to claim 17, wherein one or more of the plurality of electrical power outlets is a wall mounted electrical power outlet.

28. A system of controlling supply of electrical power according to claim 17, wherein one or more of the plurality of electrical power outlets is located in an electrical extension board wherein the electrical extension board includes the computer processor, computer memory, control module and communications module corresponding to that electrical power outlet.

* * * * *